(12) United States Patent
Jeong

(10) Patent No.: US 7,821,998 B2
(45) Date of Patent: Oct. 26, 2010

(54) EQUALIZING APPARATUS, METHODS AND COMPUTER PROGRAM PRODUCTS THAT GENERATE ERROR COMPENSATION VALUES OF AN EQUALIZER

(75) Inventor: Jun-Young Jeong, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 307 days.

(21) Appl. No.: 11/530,971

(22) Filed: Sep. 12, 2006

(65) Prior Publication Data

US 2008/0062946 A1 Mar. 13, 2008

(51) Int. Cl.
*H04B 7/216* (2006.01)
(52) U.S. Cl. .................. 370/335; 370/206; 375/229; 375/350
(58) Field of Classification Search ............ 370/350, 370/310, 335, 206–209; 375/229–236, 350
See application file for complete search history.

(56) References Cited

U.S. PATENT DOCUMENTS

| 5,450,553 | A  | * | 9/1995  | Kitagaki et al. ............ 711/214 |
| 7,283,598 | B2 | * | 10/2007 | Akita et al. ................ 375/316 |
| 2003/0103585 | A1 | * | 6/2003  | Kim et al. .................. 375/340 |
| 2004/0127164 | A1 | * | 7/2004  | Mondragon-Torres et al. ... 455/67.11 |
| 2004/0131014 | A1 | * | 7/2004  | Thompson, III et al. ..... 370/230 |
| 2004/0161066 | A1 | * | 8/2004  | Hwang et al. ............... 375/350 |

FOREIGN PATENT DOCUMENTS

| KR | 10-2005-0066479 A | 6/2005 |
| KR | 10-2005-0066634 A | 6/2005 |

* cited by examiner

*Primary Examiner*—Lester Kincaid
*Assistant Examiner*—Steven Lim
(74) *Attorney, Agent, or Firm*—Myers Bigel Sibley & Sajovec, P.A.

(57) ABSTRACT

An equalizing apparatus for an orthogonal frequency division multiplexing (OFDM) wireless communication receiving system includes a channel estimation block, a first equalizer, and an error compensation block. The channel estimation block performs channel estimation by extracting a pilot signal from a signal supplied to the first equalizer. The first equalizer performs first channel equalization based on the channel estimation from the channel estimation block. The error compensation block outputs an error compensation value of the first equalizer, based on data signals from the first equalizer. The error compensation value may be used by the first equalizer and/or a second equalizer. Related methods and computer program products are also described.

20 Claims, 11 Drawing Sheets

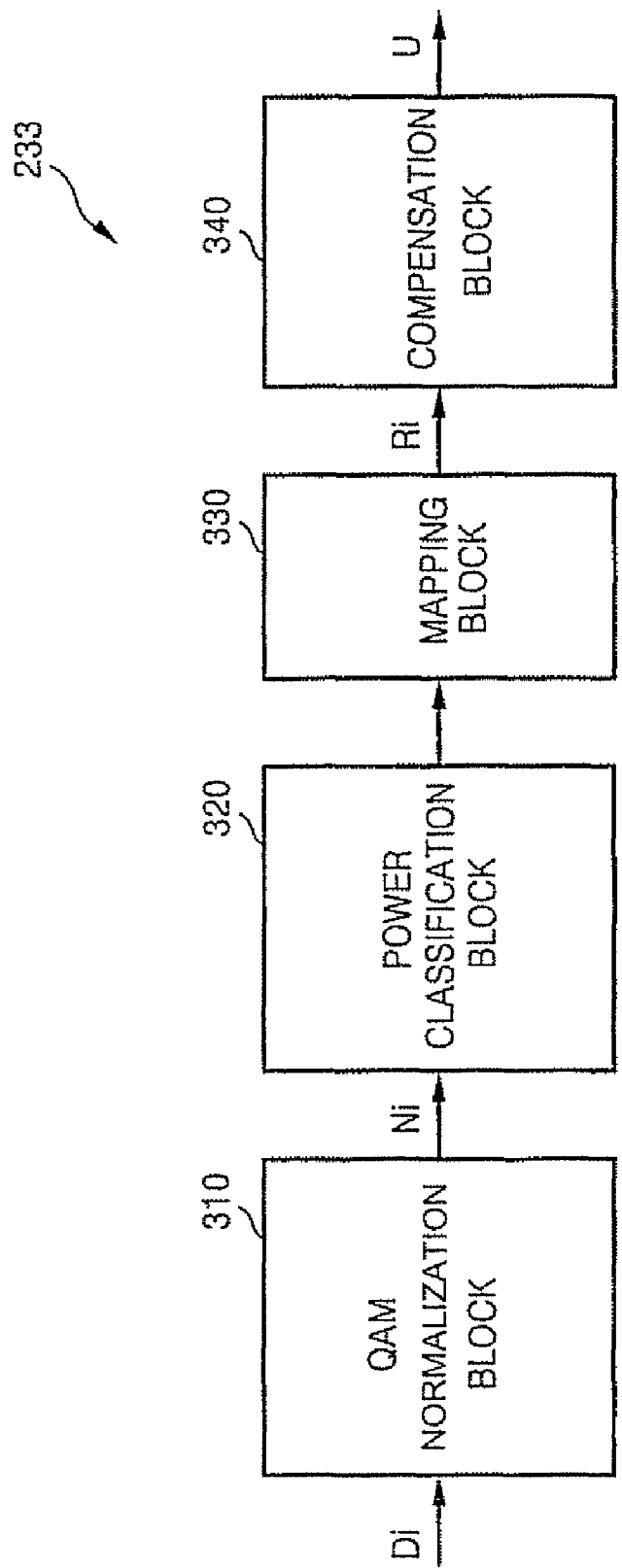

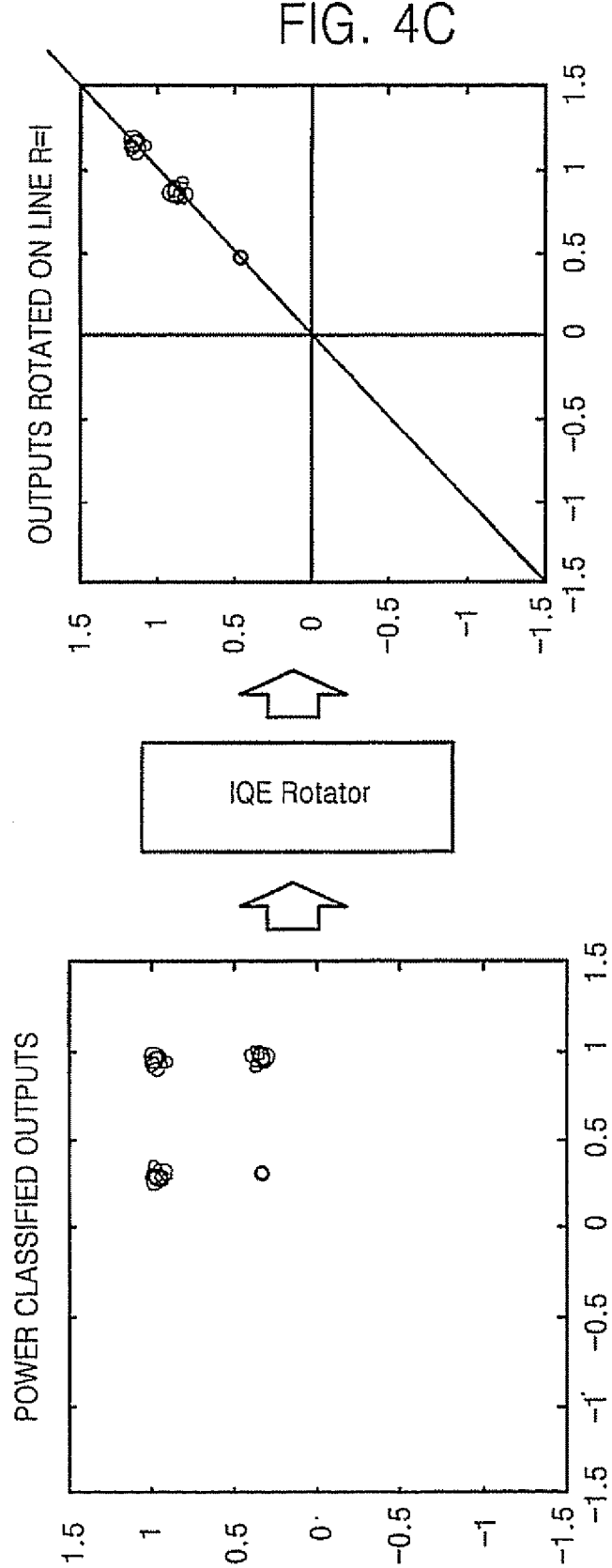

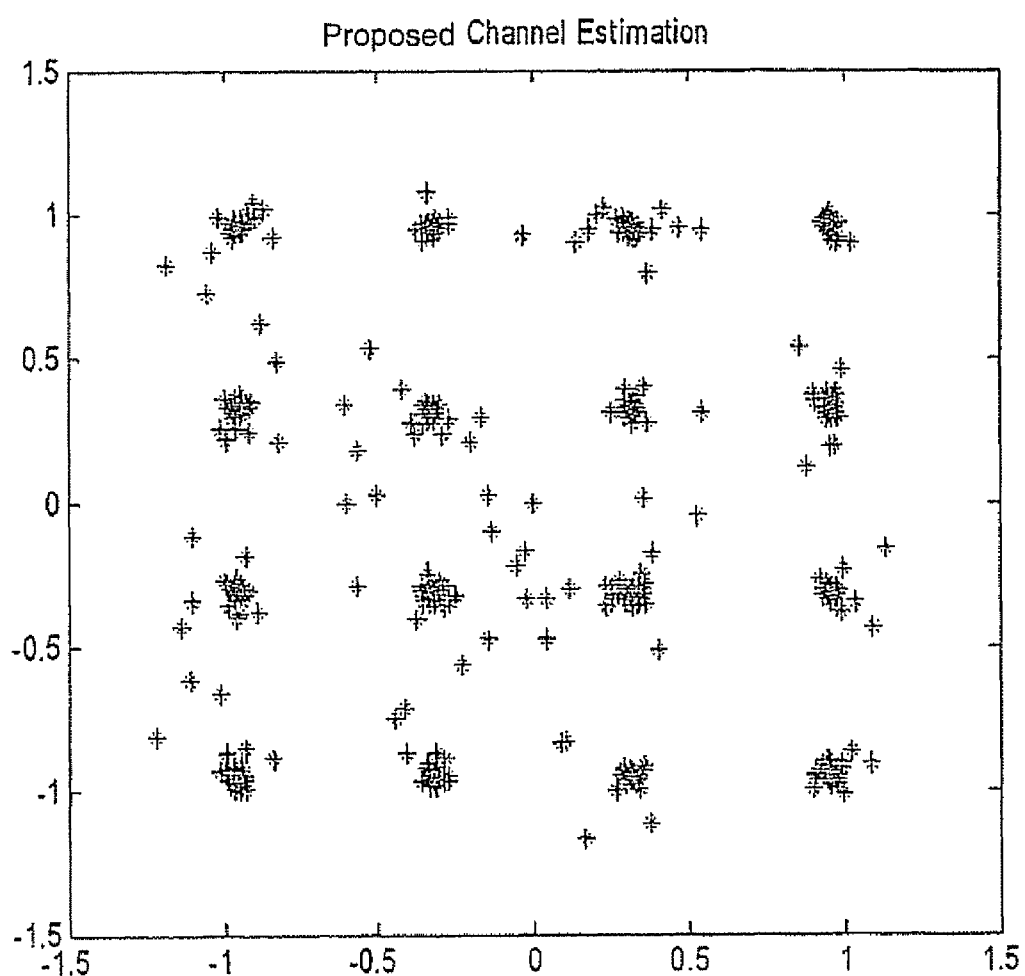

EQUALIZING APPARATUS, METHODS AND COMPUTER PROGRAM PRODUCTS THAT GENERATE ERROR COMPENSATION VALUES OF AN EQUALIZER

FIELD OF THE INVENTION

The present invention relates to wireless communication receiving systems, methods and computer program products, and more particularly, to equalizing apparatus, methods and computer program products for wireless communication receiving systems, such as quadrature amplitude modulation (QAM)-orthogonal frequency division multiplexing (OFDM) wireless communication receiving systems.

BACKGROUND OF THE INVENTION

Orthogonal frequency division multiplexing (OFDM) is an example of multi-carrier modulation techniques of converting input serial data into parallel data and transmitting them via a plurality of subcarriers. With the use of OFDM, it is possible to maintain orthogonality between adjacent subcarriers, thereby allowing increased bandwidth efficiency.

However, channel distortion generally occurs in an OFDM signal transmitted via a multi-path channel due to fading. To compensate for the channel distortion due to fading, a receiving side may include an equalizer, and channel estimation that estimates a plurality of subchannels may be provided so that the equalizer can compensate for the channel distortion.

FIG. 1 is a block diagram of a conventional OFDM receiver 10. Referring to FIG. 1, the receiver 10 includes an antenna 15, a tuner 20, an analog-to-digital converting (ADC) block 30, a Fast Fourier Transform (FFT) block 40, an equalization block 50, and a QAM demodulator 60. The tuner 20 tunes to channel frequency of a signal to be received via the antenna 15, and converts the tuned signal into a signal having a base-band frequency. The ADC block 30 converts the analog signal having the base-band frequency into a digital signal. The FFT block 40 performs an FFT operation on the digital signal and outputs the operation result.

The equalization block 50 includes a channel estimation block 51 and an equalizer 52. The channel estimation block 51 receives a signal from the FFT block 40 and estimates channel information, e.g., a channel transfer function. The equalizer 52 compensates for channel distortion due to fading, based on the channel information received from the channel estimation block 51. The QAM demodulator 60 receives a signal from the equalizer 52 and performs QAM demodulation on the signal.

To estimate and compensate for channel distortion due to a multi-path channel, a transmitter transmits a pilot signal (which is also referred to as a "pilot symbol"), and a receiver receives the pilot signal and estimates channel circumstances (or a channel response) by using the received pilot signal. Here, the pilot signal is known to both the transmitter and the receiver. An interpolation method has been introduced to perform channel estimation by using the pilot signal. Examples of the interpolation method are a linear interpolation method and a Gaussian interpolation method.

An OFDM communication system divides an available frequency band into N subchannels, and may use a specific number of subchannels of the N subchannels to transmit the pilot signal. The pilot subchannels may be dispersed among data subchannels.

It is possible to estimate a channel frequency response of the dispersed pilot subcarriers, and to estimate a channel frequency response of data subcarriers according to an interpolation method, e.g., the linear interpolation method. That is, for overall channel estimation, the receiver can extract pilot signals from a plurality of received subchannels, filter the extracted pilot signals with a low-pas filter, and estimate the characteristics of the data subchannels.

Thus, if the low-pass filter is properly designed for channel estimation, the above channel estimation method based on an interpolated signal can be very efficient.

However, when the pilot signals are exposed to noise or the degree of a channel response is small, the performance that estimates the data subchannels by using the low-pass filter may be degraded due to ripple and/or other effects.

SUMMARY OF THE INVENTION

Some embodiments of the present invention can provide an equalizing apparatus, method and/or computer program product for a wireless communication receiving system, which can improve the equalizing performance of the wireless communication receiving system that performs channel equalization by using a pilot signal, by compensating for an error in a pilot signal-based data subchannel estimation using a data signal.

According to some embodiments of the present invention, there are provided equalizing apparatus of a wireless receiving system, such as a quadrature amplitude modulation (QAM) receiving system, the equalizing apparatus including a channel estimation block, a first equalizer, and an error compensation block.

The channel estimation block performs channel estimation by extracting a pilot signal from a signal supplied to the first equalizer. The channel estimation block may estimate a data subchannel response by extracting a pilot signal from a signal supplied to the first equalizer and interpolating the pilot signal.

The first equalizer performs first channel equalization based on the channel estimation received from the channel estimation block. The error compensation block outputs an error compensation value of the first equalizer based on QAM data signals from the first equalizer. The error compensation block updates an equalization coefficient of the first equalizer and/or computes an equalization coefficient of a second equalizer that equalizes a signal output from the first equalizer, based on the error compensation value.

According to other embodiments of the present invention, there is provided a QAM-orthogonal frequency division multiplexing system that includes a front-end block, a Fourier Transform block, a channel estimation block, a first equalizer, and an error compensation block.

The front-end block includes a tuner and an analog-to-digital converting (ADC) block. The tuner tunes to a channel frequency of a signal to be received via an antenna, and converts the tuned signal into a signal having a base-band frequency. The ADC block converts the analog signal having the base-band frequency into a digital signal.

The Fourier Transform block performs a Fourier Transform operation on a signal received from the front-end block. The Fourier Transform block may be a Fast Fourier Transform (FFT) block. The channel estimation block extracts a pilot signal from the signal received from the Fourier Transform block and performs channel estimation on the pilot signal. The first equalizer performs first channel equalization based on the channel estimation from the channel estimation block.

The error compensation block outputs an error compensation value of the first equalizer based on QAM data signals from the first equalizer. An error in the first equalizer is compensated for based on the error compensation value.

According to other embodiments of the present invention, there are provided equalizing methods in a quadrature amplitude modulation (QAM) receiving system or other wireless receiving system, the method including channel estimation, first channel equalization, and error compensation.

In the channel estimation, a pilot signal is extracted from a signal supplied to a first equalizer and channel estimation is performed using the pilot signal. In the channel estimation, a data subchannel response may be estimated by extracting a pilot signal from a signal supplied to the first equalizer and interpolating the pilot signal.

The first channel equalization is performed by the first equalizer, based on the result of the channel estimation.

In the error compensation, an error compensation value of the first equalizer is output based on QAM data signals from the first equalizer. In the error compensation, an equalization coefficient of the first equalizer may be updated, or an equalization coefficient of a second equalizer that equalizes a signal from the first equalizer may be computed, based on the error compensation value.

Accordingly, some embodiments of the present invention provide equalizing methods for a wireless receiver, wherein equalization coefficients of a pilot-signal-based channel estimation equalization are updated and/or equalization coefficients of a data-based channel estimation equalization are generated, responsive to an error between a data signal produced by the pilot-signal-based channel estimation equalization relative to a reference data signal. Analogous equalizers also may be provided.

Embodiments of the present invention have been described above with respect to apparatus (systems) and/or methods. However, analogous computer program products also may be provided according to other embodiments of the invention.

BRIEF DESCRIPTION OF THE DRAWINGS

The above and other aspects and advantages of the present invention will become more apparent by describing in detail exemplary embodiments thereof with reference to the attached drawings in which:

FIG. 3 is a block diagram of an error compensation block illustrated in FIG. 2 according to some embodiments of the present invention;

FIG. 4C is a conceptual diagram illustrating mapping the power-classified QAM data signals illustrated in FIG. 4B on a line whose real-number value and imaginary-number value are the same, according to some embodiments of the present invention;

FIG. 8 is a constellation diagram of outputs of an equalizer of a 16-ary QAM-OFDM receiving system according to some embodiments of the present invention.

DETAILED DESCRIPTION OF THE INVENTION

Figure 1:
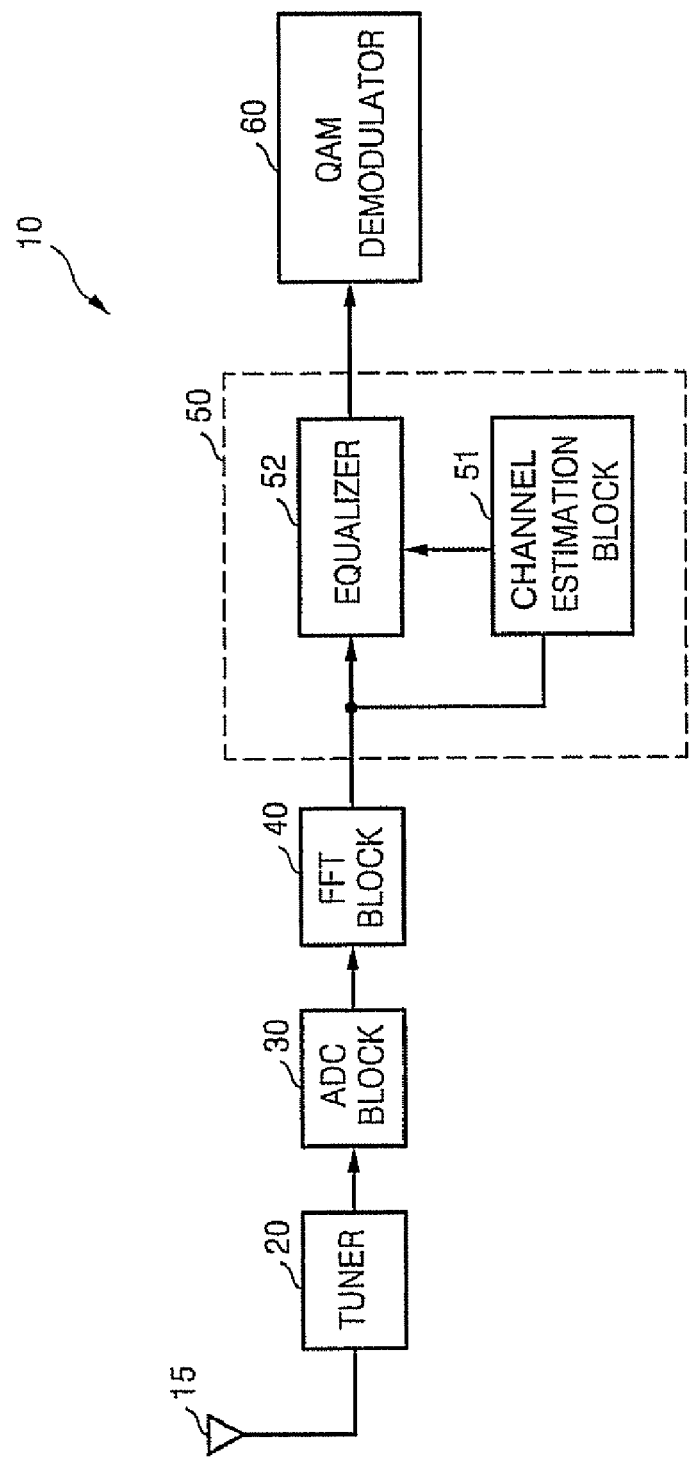
FIG. 1 is a block diagram of a conventional orthogonal frequency division multiplexing (OFDM) receiver.

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" to another element, it can be directly responsive to the other element, or intervening elements may be present. In contrast, when an element is referred to as being "directly responsive" to another elements, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first equalizer could be termed a second equalizer, and, similarly, a second equalizer could be termed a first equalizer without departing from the teachings of the disclosure.

The present invention is described below with reference to block diagrams and/or flowchart illustrations of methods, apparatus (systems and/or devices) and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated.

Figure 2:
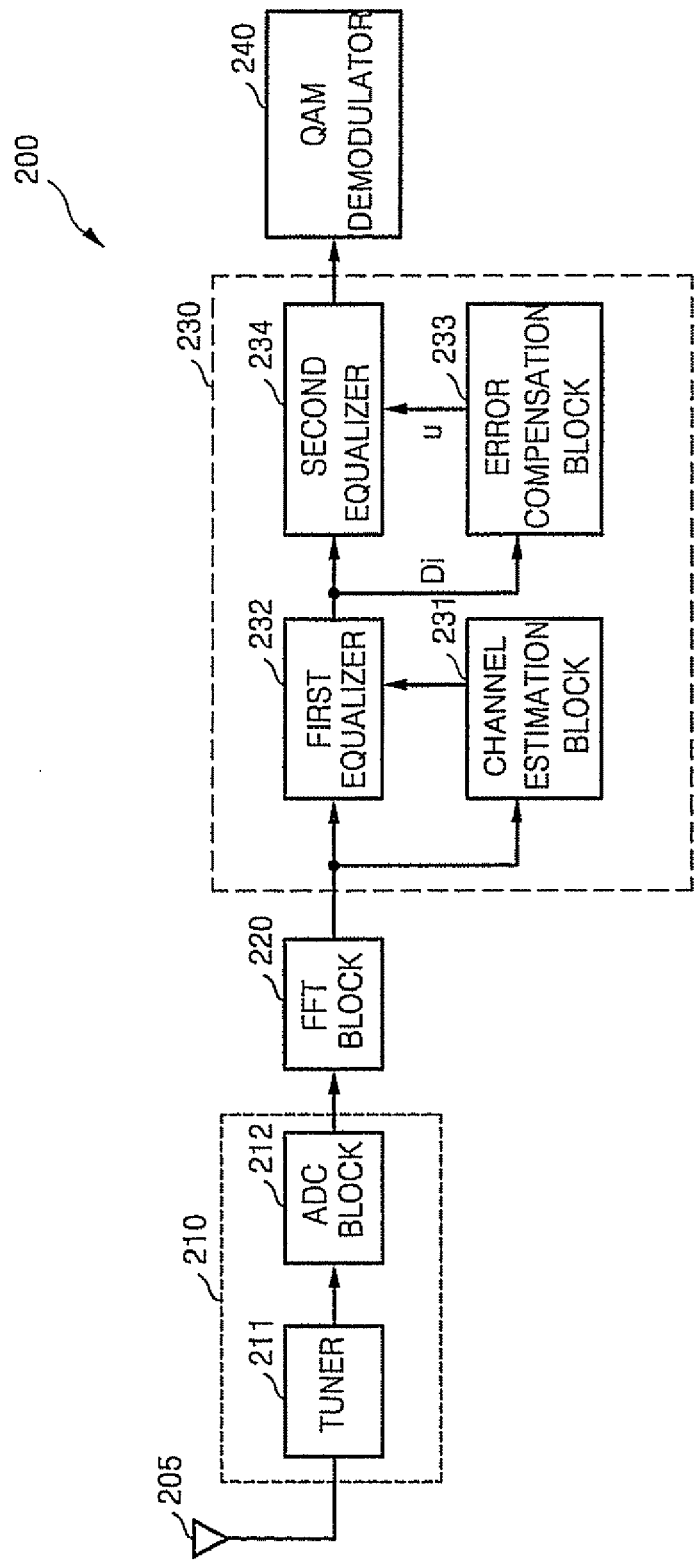
FIG. 2 is a block diagram of a quadrature amplitude modulation (QAM) receiving system having an equalization block according to some embodiments of the present invention.

FIG. 2 is a block diagram of a quadrature amplitude modulation (QAM) receiving system 200 with an equalization block 230 according to some embodiments of the present invention. Referring to FIG. 2, the receiving system 200 includes an antenna 205, a front-end block 210, a Fourier Transform block 220, an equalization block 230, and a QAM demodulator 240.

The front-end block 210 includes a tuner 211 and an analog-to-digital converting (ADC) block 212. The tuner 211 tunes to a channel frequency of a signal to be received via the antenna 205, and converts the tuned signal into an analog signal having a base-band frequency. The ADC block 212 converts the analog signal having the base-band frequency into a digital signal.

The Fourier Transform block 220 performs a Fourier Transform operation on the signal received from the front-end block 210. The Fourier Transform block 220 may be embodied to perform a Fast Fourier Transform (FFT) operation.

The equalization block 230 includes a channel estimation block 231, a first equalizer 232, an error compensation block 233, and a second equalizer 234. The channel estimation block 231 estimates channel information (a channel transfer function, etc.) from a first signal received from the Fourier Transform block 220.

For example, an orthogonal frequency division multiplexing (OFDM) communication system divides an available frequency band into N subchannels, and can use a specific number of subchannels of the N subchannels to transmit pilot signals. Accordingly, it is possible to estimate a channel frequency response of the subcarriers to transmit the pilot signals and further, estimate a channel frequency response of data subcarriers according to an interpolation method.

The first equalizer 232 equalizes the first signal based on the channel estimation from the channel estimation block 231.

The error compensation block 233 outputs an error compensation value u of the first equalizer 232 based on QAM data signals Di received from the first equalizer 232. The second equalizer 234 equalizes the QAM data signals Di from the first equalizer 232 based on the error compensation value u.

In some embodiments of the present invention, an error of the first equalizer 232 is compensated for by computing an equalization coefficient of the second equalizer 234 based on the error compensation value u, and secondarily equalizing a signal output from the first equalizer 232 by using the equalization coefficient of the second equalizer 234.

In other embodiments of the present invention, an equalization coefficient of the first equalizer 232 may be updated based on the error compensation value u from the error compensation block 233. Accordingly, in these other embodiments of the invention, a second equalizer 234 need not be used. Rather, the error compensation value u may be applied to the first equalizer 232 by the error compensation block 233 in addition to applying the channel estimation from the channel estimation block 231 to the first equalizer 232. In still other embodiments, the error compensation value u from the error compensation block 233 may be applied to both the first equalizer 232 and to the second equalizer 234.

The QAM demodulator 240 receives and modulates a signal from the first and/or second equalizer 234.

Accordingly, some embodiments of the present invention provide equalizing methods for a wireless receiver, wherein equalization coefficients of a pilot-signal-based channel estimation equalization are updated and/or equalization coefficients of a data-based channel estimation equalization are generated, responsive to an error between a data signal produced by the pilot-signal-based channel estimation equalization relative to a reference data signal. Analogous equalizers and computer program products also may be provided.

FIG. 3 is a block diagram of an error compensation block 233 illustrated in FIG. 2 according to some embodiments of the present invention. Referring to FIGS. 2 and 3, the error compensation block 233 includes a QAM normalization block 310, a power classification block 320, a mapping block 330, and a compensation block 340.

The QAM normalization block 310 maps the QAM data signals Di received from the first equalizer 232 to one quadrant with complex-number coordinates, e.g., a first quadrant. A case where the QAM normalization block 310 maps the received QAM data signals Di to the first quadrant, for example, will now be described.

Figure 4A:
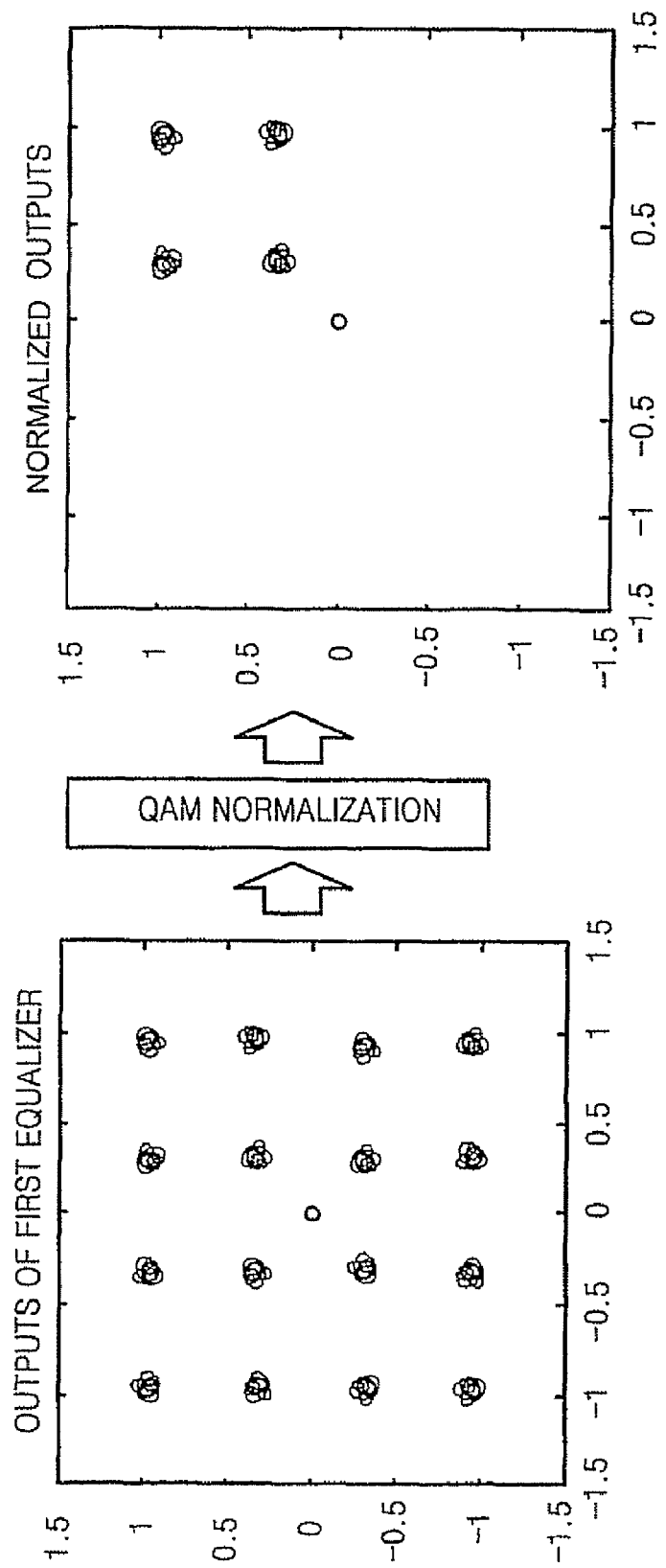
FIG. 4A is a conceptual diagram illustrating 16-ary QAM data signals whose constellation are QAM normalized to a first quadrant by a QAM normalization block according to some embodiments of the present invention.

FIG. 4A is a conceptual diagram illustrating 16-ary QAM data signals that are QAM normalized to a first quadrant by the QAM normalization block 310 of FIG. 3. Referring to FIGS. 3 and 4A, the 16-ary QAM data signals Di output from the first equalizer 232 are mapped to the first quadrant through QAM normalization.

To map the 16-ary QAM data signals Di to the first quadrant, when the product of the real-number part and the imaginary-number part of the coordinates of each of the data signals Di is a positive number, the QAM normalization block 310 may determine the absolute values of the real-number part and the imaginary-number part as a real-number part and an imaginary-number part of normalized QAM data signals Ni, respectively.

If the product of the real-number part and the imaginary-number part of the coordinates of the data signal Di is a negative number, the coordinates of the real-number part and the imaginary-number part may be exchanged, and the absolute values of the exchanged real-number part and imaginary-number part may be determined as the coordinates of the real-number part and the imaginary-number part of the normalized QAM data signals Ni, respectively.

The power classification block 320 classifies the normalized QAM data signals Ni according to a predetermined reference power level.

Figure 4B:
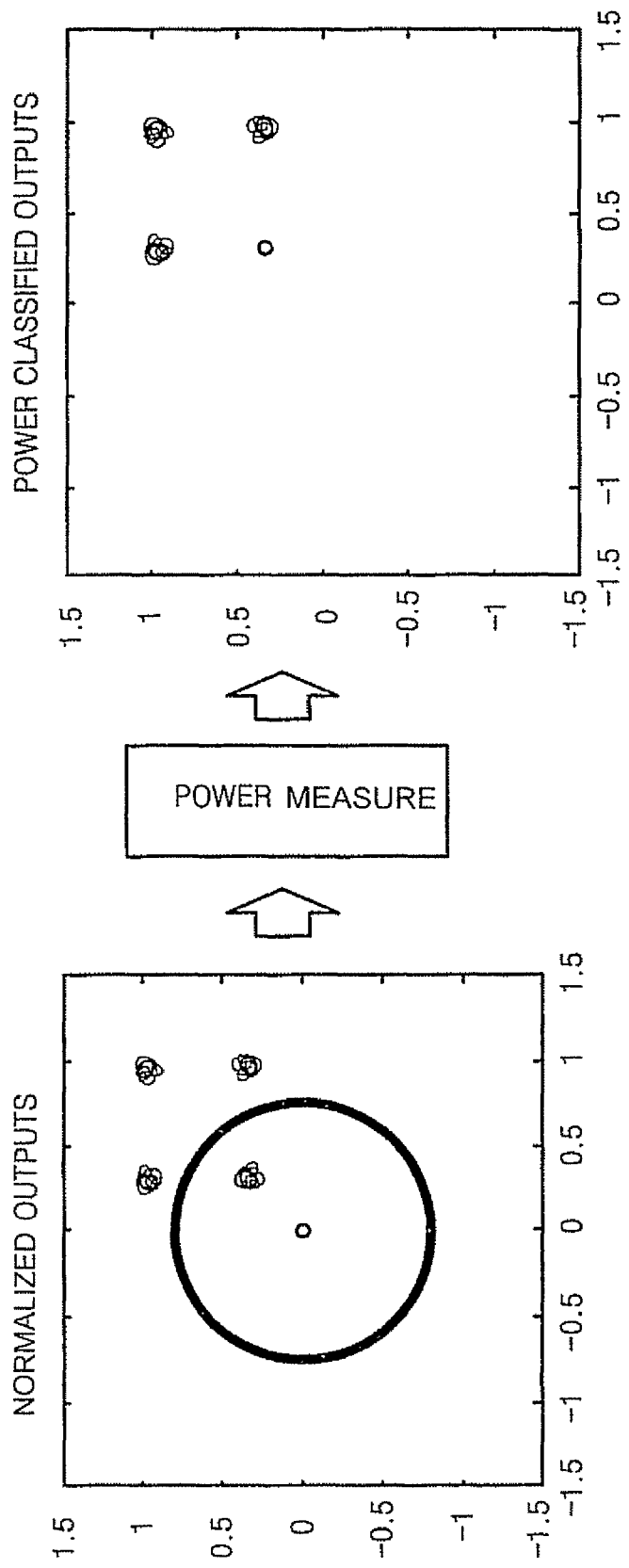
FIG. 4B is a conceptual diagram illustrating classifying of the data signals of FIG. 4A, which are normalized to the first quadrant, according to power by a power classification block, according to some embodiments of the present invention.

FIG. 4B is a conceptual diagram illustrating classifying of the QAM data signals Ni illustrated in FIG. 4A, which are normalized to the first quadrant, according to power by the power classification block 320, according to some embodiments of the present invention. Referring to FIG. 4B, the normalized QAM data signals Ni are classified to cancel signals whose power levels are lower than a predetermined reference power level (which are included within a circle illustrated in FIG. 4B).

The mapping block 330 maps the classified QAM data signals Ni based on a second function. The second function is a function that maps reference QAM signals, which are mapped to one of the quadrants with the complex-number coordinates, e.g., a first quadrant, to the predetermined reference coordinates. The reference QAM signal is a QAM signal that contains no noise and has ideal QAM coordinates.

The reference coordinates may be set to be located on a line R=I whose real-number value R and imaginary-number value I are the same. The mapping block 330 may map the classified QAM data signals based on a function that maps the coordinates of the reference QAM signal on the line R=I and shifts the mapped signal to the reference coordinates.

Figure 4D:
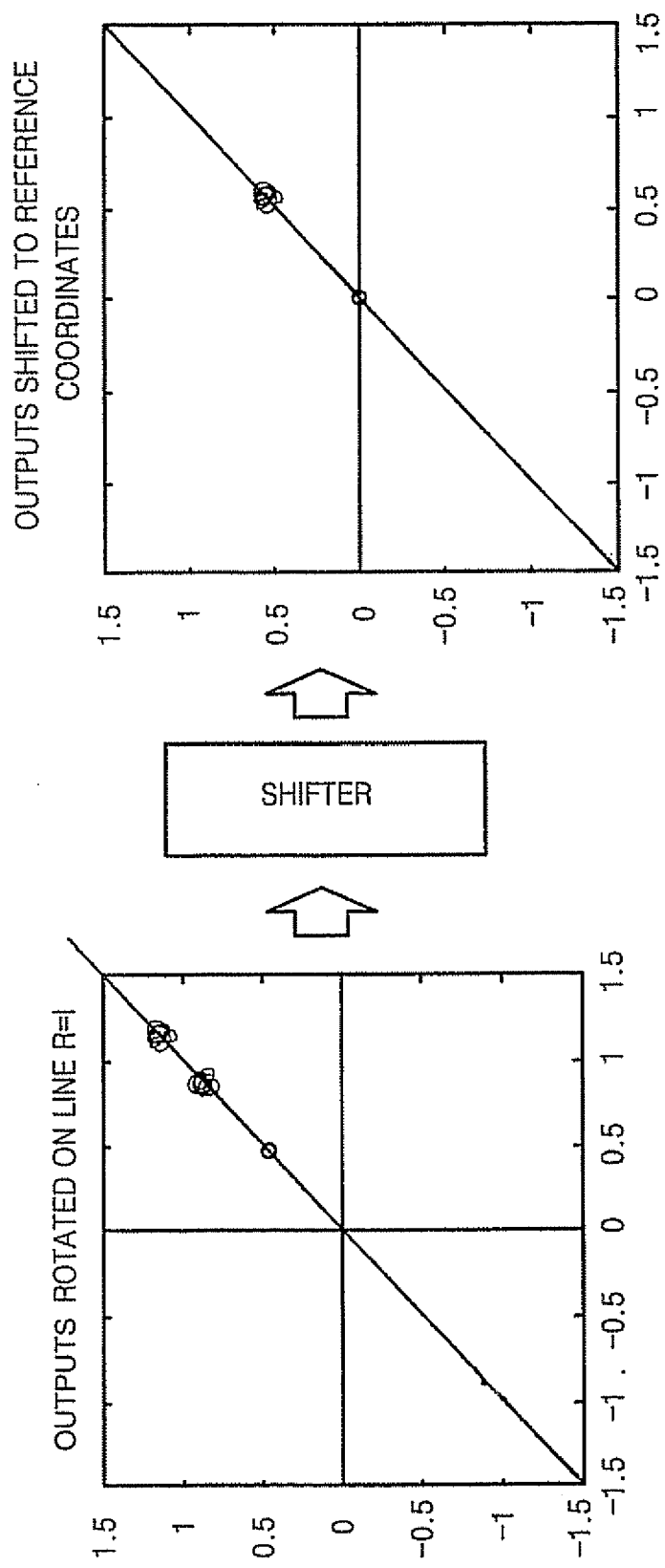
FIG. 4D is a conceptual diagram illustrating shifting the mapped QAM data signals illustrated in FIG. 4C to reference coordinates, according to some embodiments of the present invention.

FIGS. 4C and 4D illustrate mapping of the QAM data signals illustrated in FIG. 4B which are classified according to power to or around the predetermined reference coordinates by using the mapping block 330 based on a second function, according to some embodiments of the present invention. Here, the second function is a function that maps reference QAM signals, which are mapped to one of the quadrants with the complex-number coordinates, e.g., a first quadrant, to the predetermined reference coordinates.

Specifically, FIG. 4C is a conceptual diagram illustrating mapping of the power-classified QAM data signals illustrated in FIG. 4B on a line R=I whose real-number value R and imaginary-number value I are the same. Referring to FIG. 4C, the classified QAM data signals are mapped to or around the line R=I by using a predetermined rotation vector. Assuming that reference coordinates are located on the line R=I, the rotation vector that maps a QAM signal having random coordinates (M+N j) on the line R=I is ((M÷N)+(M−N)j).

FIG. 4D is a conceptual diagram illustrating shifting of the mapped QAM data signals illustrated in FIG. 4C to reference coordinates. Referring to FIG. 4D, the QAM data signals mapped on the line R=I are mapped to or around the reference coordinates through a predetermined shift.

Through the above mapping process, the QAM data signals Di output from the first equalizer 232 are mapped to or around the reference coordinates, but an error between the coordinates of the QAM data signal Di and the corresponding reference QAM signal is maintained. Accordingly, it is possible to estimate an error of the first equalizer 232 and calculate an error compensation value the first equalizer 232 by using the reference coordinates and coordinates mapped thereto.

The compensation block 340 outputs an error compensation value u of the first equalizer 232, based on the reference coordinates, and the coordinates of the QAM data signals mapped by the mapping block 330.

The compensation block 340 is capable of computing an equalization coefficient of the second equalizer 234, based on a ratio of the reference coordinates to average values of the coordinates of the mapped QAM data signals Ri. For example, the error compensation block 340 computes average values of the coordinates of the mapped QAM data signals Ri for the period of N symbols, and the error compensation value U of the first equalizer 232 based on the computed average values and the predetermined reference coordinates (N is an integer greater than 1).

Figure 5:
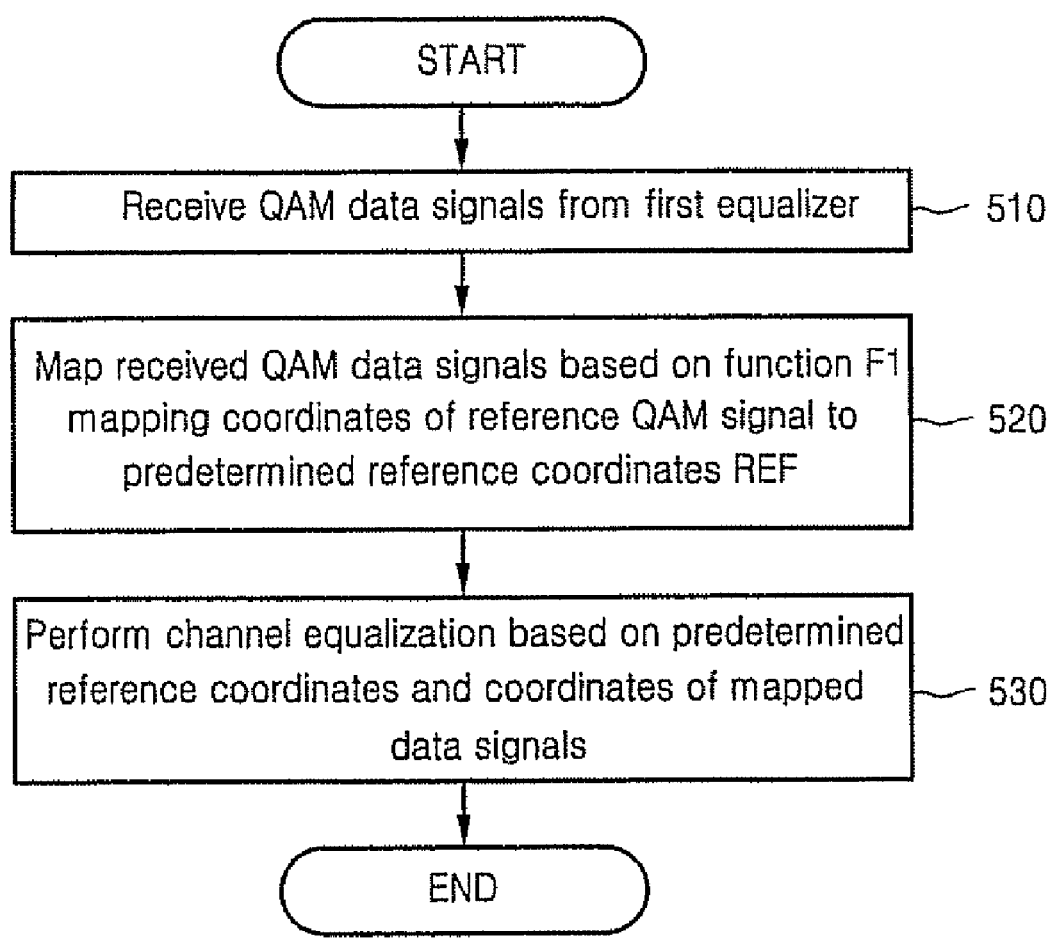
FIG. 5 is a flowchart illustrating equalizing according to some embodiments of the present invention.

FIG. 5 is a flowchart illustrating equalizing in an OFDM receiving system according to some embodiments of the present invention. Referring to FIG. 5, QAM data signals are received from a first equalizer of the OFDM receiving system (Block 510). Next, the received QAM data signals are mapped based on a first function f1 that maps the coordinates of reference QAM signals to predetermined reference coordinates REF (Block 520). Next, channel equalization is performed based on the predetermined reference coordinates REF and the coordinates of the mapped QAM data signals (Block 530).

Equalizing based on the reference coordinates REF and the coordinates of QAM data signals which are mapped by the first function f1 will now be described.

A signal output from the first equalizer is a channel-compensated signal. Thus, if an equalization coefficient of the first equalizer is not accurate, the coordinates of the QAM data signals mapped by the first function f1 are mapped around the reference coordinates REF, not to the reference coordinates REF. The more accurate the equalization coefficient of the first equalizer, the closer the mapped QAM data signals are mapped to the reference coordinates.

It is assumed that R(i) denotes the result of mapping a signal output from the first equalizer via an $i^{th}$ subchannel based on the first function f1, H(i) denotes the $i^{th}$ subchannel response, X(i) denotes the $i^{th}$ subchannel transmission signal, FEQ(i) denotes the $i^{th}$ subchannel equalization coefficient obtained by interpolating, Ravg denotes an average value of the result R(i) obtained for the period of N symbols, and U(i) denotes an error of the first equalizer of the $i^{th}$ subchannel.

The result R(i) is given by:

$$R(i)=f1(H(i) \times X(i) \times FEQ(i)) \qquad (1)$$

The average value Ravg is given by:

$$Ravg = \frac{1}{N}\sum_{k=1}^{N} R(i,k) \qquad (2)$$

The error U(i) is given by:

$$U(i) = \frac{REF}{Ravg} \qquad (3)$$

Accordingly, it is possible to update the equalization coefficient of the first equalizer of the $i^{th}$ subchannel and/or compute an equalization coefficient of a second equalizer that equalizes a signal output from the first equalizer of the $i^{th}$ subchannel, based on the error U(i).

Figure 6:
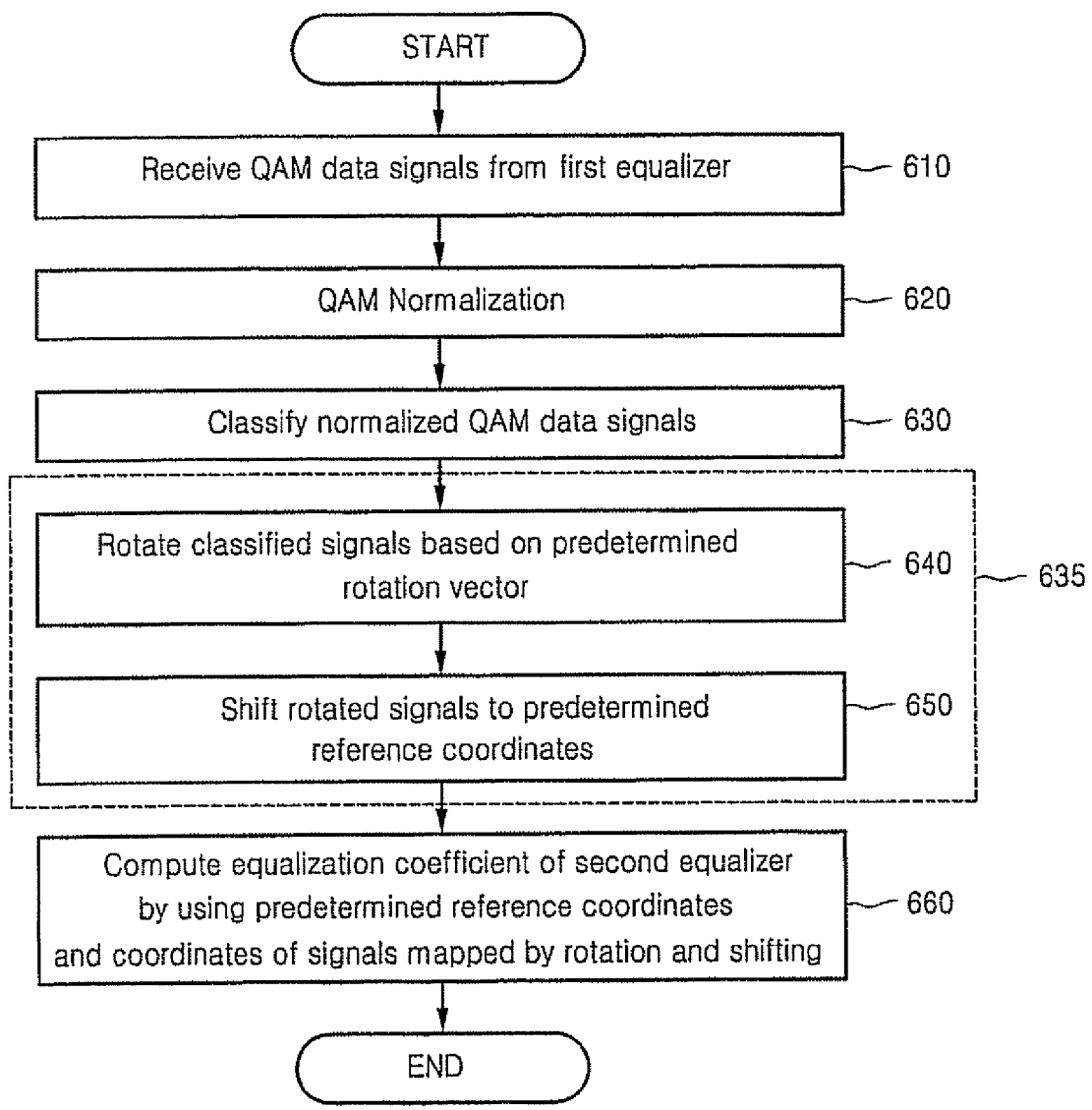
FIG. 6 is a flowchart illustrating equalizing according to other embodiments of the present invention.

FIG. 6 is a flowchart illustrating equalizing in an OFDM receiving system according to other embodiments of the present invention. Referring to FIG. 6, QAM data signals are received from a first equalizer of the OFDM receiving system (Block 610). Next, the received QAM data signals are mapped to one of quadrants with complex-number coordinates (mapping the QAM data signals is referred to QAM normalization) (Block 620).

Mapping the received QAM data signals to a first quadrant, for example, will now be described. If the product of a real-number part R and an imaginary-number part I of each of the received QAM data signals is a positive number, i.e., when R×I>0, the received QAM data signals are mapped to the first quadrant by computing absolute values of the real-number part R and the imaginary-number part I. If the product of the real-number part R and the imaginary-number part I is a negative value, i.e., when R×I<0, the coordinates of the real-number part R and the imaginary-number part I are exchanged and absolute values of the real-number part R and the imaginary-number part I are computed in order to map the QAM data signals to the first quadrant.

Next, the normalized QAM data signals are categorized according to a predetermined reference power level (Block 630). The coordinates of some of the normalized data signals, which have levels lower than the reference power level, are replaced with those of reference QAM signals. Since the value of a pilot signal is generally greater than that of a data signal, this replacement is accomplished to perform channel estimation by using the data signal only when the value of the data signal approximates the value of the pilot signal.

Next, the classified signals are mapped based on a second function f2 (Block 635). In some embodiments, the second function f2 is a function that maps the reference QAM signals, which are mapped to one of quadrants with complex-number coordinates, e.g., a first quadrant, to predetermined reference coordinates. Operations of Block 635 may include rotating the classified signals based on a predetermined rotation vector (Block 640), and shifting the rotated signals to or around the predetermined reference coordinates (Block 650).

For example, it is assumed that the predetermined reference coordinates are located on a line R=I whose real-number part R and imaginary-number part I are the same. In this case, the coordinate of the rotation vector used to map the coordinates (M+Nj) of the reference QAM signal on the line R=I is ((M+N)+(M−N)j). The reference QAM signal mapped on the line R=I by using the rotation vector is shifted to the predetermined reference coordinates (Block 640 and Block 650).

Therefore, the second function f2 that maps the QAM normalized coordinates of the reference QAM signals to the predetermined reference coordinates, is determined by mapping and shifting the reference QAM signals by using the rotation vector. The classified QAM data signals are mapped based on the second function f2. Operations of Block 520 illustrated in FIG. 5 may include operations of Blocks 620 through 650.

Next, an equalization coefficient of the second equalizer is computed by using the predetermined reference coordinates and the result of mapping the classified signals by using QAM normalization and the second function f2 (Block 660).

Figure 7:
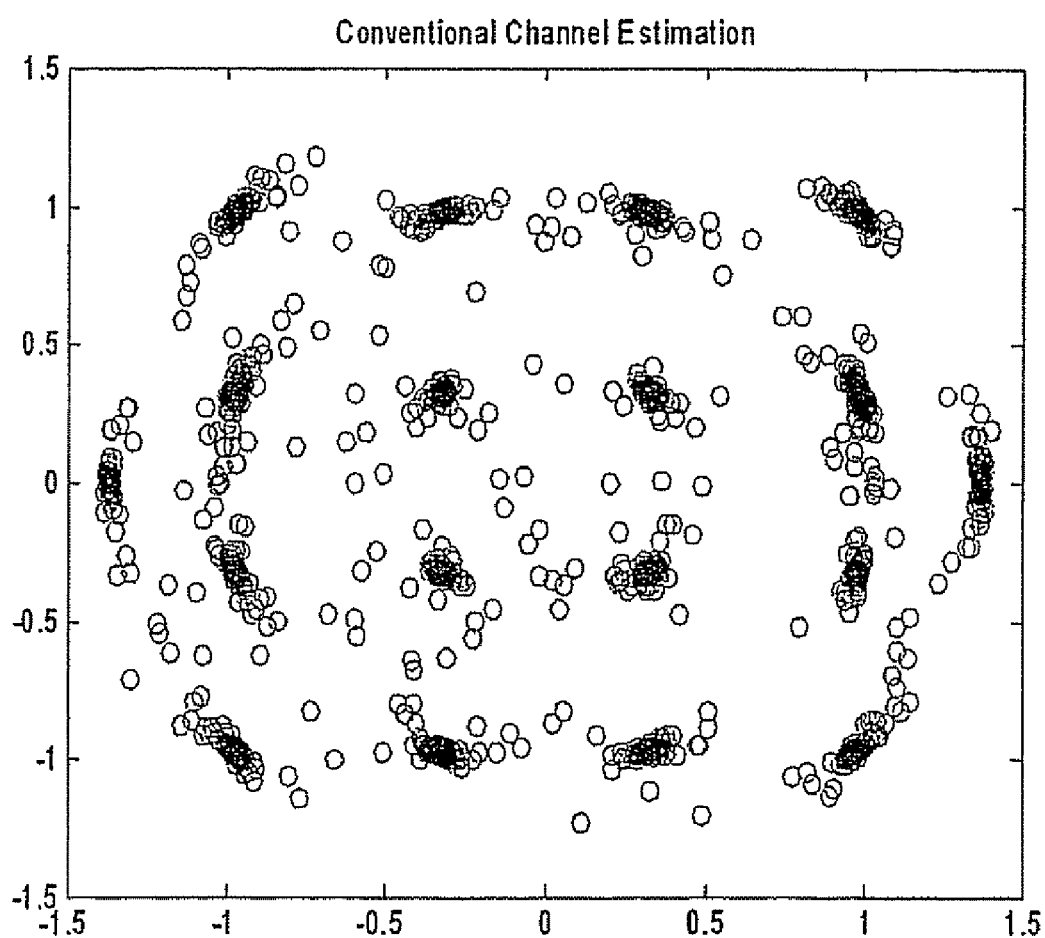
FIG. 7 is a constellation diagram of outputs of an equalizer of a conventional 16-ary QAM-OFDM receiving system.

FIG. 7 is a constellation diagram of signals output from an equalizer of a conventional 16-ary QAM-OFDM receiving system. FIG. 8 is a constellation diagram of signals output from an equalizer of a 16-ary QAM-OFDM receiving system according to some embodiments of the present invention. Referring to FIGS. 7 and 8, the coordinates of the signals illustrated in FIG. 8 are more adjacent to sixteen 16-ary QAM reference coordinates than those of the signals illustrated in FIG. 7. Accordingly, the performance of equalizing according to some embodiments of the present invention can be better than that of conventional equalizing that performs channel equalization by extracting and interpolating only pilot signals.

As described above, in equalizing apparatus, methods and/or computer program products according to some embodiments of the present invention, an error of a first equalizer may be computed by using the coordinates of data signals equalized by the first equalizer based on channel estimation performed by interpolating pilot signals, and an equalization coefficient of the receiving system may be precisely computed from the computed error, which can improve the equalization performance.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. An equalizing apparatus for a wireless receiving system, comprising:
   a channel estimation block configured to perform channel estimation by extracting a pilot signal from a signal supplied to the equalizing apparatus;
   a first equalizer configured to perform first channel equalization based on the channel estimation from the channel estimation block to produce data signals; and
   an error compensation block configured to output an error compensation value of the first equalizer based on predetermined reference coordinates and a result of mapping the data signals from the first equalizer based on a first function which maps coordinates of reference signals to the predetermined reference coordinates,
   wherein an error of the first equalizer is compensated for based on the error compensation value; and
   an equalization coefficient of a second equalizer configured to equalize a signal output from the first equalizer is computed, based on the error compensation value.

2. The equalizing apparatus of claim 1,
   wherein the channel estimation block is configured to estimate a data subchannel response by extracting the pilot signal from the signal supplied to the first equalizer and interpolating using the extracted pilot signal.

3. The equalizing apparatus of claim 1, wherein the wireless receiving system is a quadrature amplitude modulation (QAM) receiving system and wherein the error compensation block comprises:
a QAM normalization block configured to map QAM data signals from the first equalizer to one of quadrants with complex-number coordinates;
a power classification block configured to classify the normalized QAM data signals according to a predetermined reference power level;
a mapping block configured to map the classified QAM data signals based on a second function; and
a compensation block configured to output the error compensation value of the first equalizer, based on the predetermined reference coordinates and coordinates of the mapped QAM data signals,
wherein the second function is a function which maps the reference QAM signals, which are mapped to one of the quadrants with the complex-number coordinates, to the predetermined reference coordinates.

4. The equalizing apparatus of claim 3, wherein the compensation block is configured to compute average values of the coordinates of the mapped QAM data signals based on the second function for a period of N symbols and to update the equalization coefficient of the first equalizer or to compute an equalization coefficient of the second equalizer configured to equalize the signal from the first equalizer, based on a ratio of the predetermined reference coordinates to the computed average values, where N is an integer greater than 1.

5. The equalizing apparatus of claim 3, wherein the QAM normalization block is configured to determine coordinates of a QAM normalized real-number part and imaginary-number part by computing absolute values of a real-number part and an imaginary-number part of coordinates of the data signal from the first equalizer when a product of the real-number part and the imaginary-number part of coordinates of the data signal is a positive value, and by exchanging the coordinates of the real-number part and the imaginary-number part and computing absolute values of the real-number part and the imaginary-number part when the product is a negative value.

6. The equalizing apparatus of claim 3, wherein the power classification block is configured to classify the normalized QAM data signals to cancel some of the QAM data signals, which have levels lower than the predetermined reference power level.

7. The equalizing apparatus of claim 3, wherein the predetermined reference coordinates are located on a line; and
wherein respective magnitudes of the real and imaginary parts of the predetermined reference coordinates are equivalent.

8. The equalizing apparatus of claim 1, wherein the wireless receiving system comprises:
a front-end block configured to convert a received signal into a signal having a base-band frequency; and
a Fourier transform block configured to perform a Fourier transform operation on a signal from the front-end block;
wherein the channel estimation block is configured to perform channel estimation by extracting a pilot signal from a signal received from the Fourier transform block.

9. The equalizing apparatus of claim 8, which a equalization coefficient of the first equalizer is updated or the equalization coefficient of the second equalizer configured to equalize the signal from the first equalizer is computed, based on the error compensation value.

10. The equalizing apparatus of claim 8, wherein the wireless receiving system is a quadrature amplitude modulation (QAM) receiving system and wherein the error compensation block comprises:
a QAM normalization block configured to map QAM data signals from the first equalizer to one of quadrants with complex-number coordinates;
a power classification block configured to classify the normalized QAM data signals according to a predetermined reference power level;
a mapping block configured to map the classified QAM data signals based on a second function; and
a compensation block configured to output the error compensation value of the first equalizer, based on the predetermined reference coordinates and coordinates of the mapped QAM data signals based on the second function,
wherein the second function is a function which maps the reference QAM signals, which are mapped to one of the quadrants with the complex-number coordinates, to the predetermined reference coordinates.

11. The equalizing apparatus of claim 8, wherein the compensation block is configured to compute average values of the coordinates of the mapped QAM data signals based on second function for a period of N symbols and to update the equalization coefficient of the first equalizer or to compute an equalization coefficient of the second equalizer configured to equalize the signal from the first equalizer, based on a ratio of the predetermined reference coordinates to the computed average values, where N is an integer greater than 1.

12. An equalizing method in a wireless receiving system, comprising:
performing channel estimation by extracting a pilot signal;
performing a first channel equalization based on the channel estimation to produce data signals;
mapping the data signals from the first equalization based on a first function which maps coordinates of reference signals to predetermined reference coordinates; and
computing an error compensation value of the first equalization, based on the result of the mapping and predetermined reference coordinates,
wherein an error in the first equalization is compensated for based on the error compensation value, and
wherein the equalizing method further comprising computing an equalization coefficient for a second equalization that equalizes a signal from the first equalization, based on the error compensation value.

13. The method of claim 12, wherein performing channel estimation comprises extracting the pilot signal from a signal supplied to the first equalization, and estimating a data subchannel response by interpolating using the pilot signal.

14. The method of claim 12 wherein the wireless receiving system is a quadrature amplitude modulation (QAM) receiving system and wherein determining an error compensation value comprises:
QAM normalizing by mapping the QAM data signals from the first equalization to one of quadrants with complex-number coordinates;
classifying the normalized QAM data signals based on a predetermined reference power level;
mapping the classified QAM data signals based on a second function; and
outputting an error compensation value of the first equalization, based on the predetermined reference coordinates and coordinates of the mapped QAM data signals based on the second function, wherein the second function is a function that maps the reference QAM signals, which are mapped to one of the quadrants, to the predetermined reference coordinates.

15. The method of claim 14, wherein outputting an error compensation value of the first equalization, based on the predetermined reference coordinates and coordinates of the mapped QAM data signals based on the second function, comprises:
computing average values of the coordinates of the mapped QAM data signals based on the second function for a period of N symbols, where N is an integer greater than 1; and
updating the equalization coefficient of the first equalization, or computing an equalization coefficient of a second equalization that equalizes the signal output from the first equalization, based on a ratio of the predetermined reference coordinates to the computed average values.

16. The method of claim 14, wherein during QAM normalizing, coordinates of a QAM normalized real-number part and imaginary-number part are determined by computing absolute values of a real-number part and an imaginary-number part of coordinates of the data signal output from the first equalization when a product of the real-number part and the imaginary-number part is a positive value, and by exchanging the coordinates of the real-number part and the imaginary-number part and computing absolute values of the exchanged coordinates when the product is a negative value.

17. The method of claim 16, wherein during classifying the normalized QAM data signals based on a predetermined reference power level, the QAM data signals are classified to cancel some of the QAM data signals which have power levels lower than the predetermined reference power level.

18. The method of claim 17, wherein mapping the classified QAM data signal based on a predetermined reference power level comprises:
rotating the classified QAM data signals by using a predetermined rotation vector; and
shifting the rotated signals to or around the predetermined reference coordinates.

19. An equalizing method for a wireless receiver comprising:
updating equalization coefficients of a pilot-signal-based channel estimation equalization and/or generating equalization coefficients for a data-signal-based channel estimation equalization, responsive to an error between a data signal produced by the pilot-signal-based channel estimation equalization relative to a reference data signal,
wherein generating equalization coefficients for a data-signal-based channel estimation equalization comprises:
mapping the data signal produced by the pilot-signal-based channel estimation equalization based on a first function which maps coordinates of the reference data signal to predetermined reference coordinates;
computing an error compensation value of the pilot-signal-based channel estimation equalization, based on the result of the mapping and predetermined reference coordinates; and
computing equalization coefficients for the data-signal-based channel estimation equalization the error compensation value of the pilot-signal-based channel estimation equalization.

20. An equalizer that is configured to perform the method of claim 19.

* * * * *